Dec. 9, 1969     W. KNAPP ET AL     3,482,659

HYDRODYNAMIC BRAKE FOR AUTOMOTIVE VEHICLES

Filed Oct. 19, 1967     2 Sheets-Sheet 2

FIG. 2

WILHELM KNAPP
KARL SCHLÖR
INVENTORS.

BY

Karl F. Ross

ATTORNEY

3,482,659
HYDRODYNAMIC BRAKE FOR AUTOMOTIVE VEHICLES

Wilhelm Knapp, Bad Homburg, and Karl Schlör, Biebesheim, Rhineland, Germany, assignors to Alfred Teves G.m.b.H., Frankfurt am Main, Germany, a corporation of Germany
Filed Oct. 19, 1967, Ser. No. 681,044
Claims priority, application Germany, Oct. 28, 1966, T 32,408
Int. Cl. F16d 57/02, 65/78
U.S. Cl. 188—90                                  10 Claims

ABSTRACT OF THE DISCLOSURE

A hydrodynamic brake system in which a rotor coupled with the drive train of an automotive vehicle displaces hydraulic braking fluid over a closed path. This path includes a heat exchanger for dissipating the kinetic braking energy. A venting system is provided for reducing the gas-pressure head in the hydrodynamic brake, thereby permitting filling of the latter with the braking fluid and eliminating resistance to such filling by compressed gases trapped in the decelerator.

---

Our present invention relates to a hydrodynamic brake for automotive vehicles and, more particularly, to a brake system of this character with increased efficiency.

It has already been proposed to provide automotive vehicles and, especially, large-capacity trucks and similar heavy-duty vehicles for use in mountainous and hilly terrains with so-called "hydrodynamic-brake systems" along the power train or at the power shaft for restricting rotation thereof relative to the chassis or some other brake-support member. The term "power shaft" is used herein to refer to the elongated drive member which is commonly connected to the output side of the engine and transmission assembly and to the driven member, e.g. the differential, in the wheel-drive chain by universal or cardan joints or couplings at opposite ends of the power shaft. The universal joints are required to permit torque transfer to the wheels without stress in spite of the fact that the wheel assemblies and the chassis are in constant relative movement in the vertical direction because of road irregularities, oscillations, and the like.

A hydrodynamic brake generally comprises a closed, pressure-retentive chamber whose housing is provided with a first toroidal shell half connected with the shaft to be braked and, therefore, rotatably entrained therewith while defining with a confronting shell half, fixed or of limited rotatability in the housing, a plurality of chambers separated by vanes in the manner of a torque converter. When the brake is operative, a hydraulic fluid in the housing is centrifugally pumped around by the interaction of the rotating "rotor" and stationary "stator" members and with an efficiency determined by the pumping characteristics, the pressure and the quantity of fluid in the chamber, etc.; the braking action is converted into fluid friction and heat, thereby transforming kinetic energy of the motion of the shaft into molecular energy in the form of heat. The heat developed in the fluid is generally proportional to the degree of braking and such devices are provided with heat exchangers for dissipating such thermal energy. The heat-dissipation device may be an indirect exchanger of the radiator type in which the heat of the braking liquid is dissipated into air forced through the radiator by a fan driven from the engine or resulting from vehicular movement. Alternatively, indirect liquid/liquid heat exchange may be used to transfer the brake heat to the engine-cooling system which, in turn, dissipates engine and braking heat to the atmosphere in the usual manner. Hydrodynamic brakes of this general character are described in the commonly assigned Patents No. 3,265,162 of Aug. 9, 1966 and No. 3,302,755 of Feb. 7, 1967.

In the latter system, the vehicle-brake arrangement includes a hydraulic decelerator or hydrodynamic brake coupled with the shaft and having a rotor member mounted thereon while its stator member is connected with the vehicle chassis for reducing the rotary speed of the shaft upon delivery of hydraulic fluid to the interior or closed housing of the decelerator. To permit the shaft to be brought to standstill, an operation which cannot effectively be carried out merely by control of the fluid pressure within the decelerator chamber, there is provided fluid-responsive friction-brake means in the decelerator or indirectly coupled with the power shaft and energizable with brake fluid. The brake-operating means there comprises the usual master cylinder which supplies fluid under pressure to both the friction-brake means and the hydraulic decelerator or hydrodynamic brake. As pointed out in these patents, the system may include differential valve means to maintain the total braking force applied to the vehicle by the hydraulic decelerator and the friction brake substantially constant for all shaft speeds. Other hydraulic decelerator structures or hydrodynamic brakes are described in U.S. Patents No. 1,297,225 and No. 2,241,189, while control systems for hydrodynamic brakes of similar character are described in the commonly assigned copending applications Ser. No. 668,462, filed Sept. 18, 1967 by Heinrich Oberthür, and Ser. No. 669,941, filed Sept. 22, 1967 by G. R. Botterill, Hans-Christof Klein and Heinrich Oberthür. A system for mounting hydrodynamic brakes in the power train, so that the power-shaft length between the universal and cardan joints is not foreshortened, has been described in the further commonly assigned copending application Ser. No. 674,568, filed Oct. 11, 1967 by Kurt Franke and entitled "Hydrodynamic Brake Assembly for Power Shaft," now abandoned. According to that system, the rotor shaft of the hydrodynamic brake forms part of the power shaft between the universal joints and is proximal to one of them while the stator surrounds the rotor shaft and is affixed to a support by a pivotal assembly whose horizontal axis passes through the center of this universal joint.

In all of these systems, the rotor of the hydraulic decelerator acts as a pump circulating the brake fluid along a closed path including the heat-exchanger means described earlier which serves to dissipate the braking energy upon its transformation into heat. The decelerator chamber is sealed and pressure-retentive while the regulation of the braking operation is effected by charging this chamber with the hydraulic fluid from a suitable reservoir. As pointed out in the copending applications mentioned earlier, it is preferred to use for this purpose a so-called charging cylinder in which the hydraulic brake fluid is under positive (i.e. superatmospheric) gas pressure and is thereby delivered to the decelerator chamber. The gas pressure may arise from the use of an auxiliary pump forcing the brake fluid against a static head of gas, as in a hydraulic accumulator, or may be generated by connecting the gas chamber of the charging cylinder with a source of gas pressure such as an air compressor. Furthermore, it is pointed out in those applications that it is desirable to withdraw the brake fluid as effectively as possible into the charging cylinder when brake operation is not desired and, to this end, the gas chamber above the liquid in the charging cylinder may be subjected to negative (i.e. subatmospheric) or to ambient (i.e. atmospheric) pressure.

In most prior-art systems in which a hydrodynamic brake is charged with fluid under pressure, the liquid supplied to the housing of the hydrodynamic brake is resisted by a gas-pressure head therein. While the pressure supplied alternately may be sufficient if, say, of the order of several atmospheres (e.g. 6 atmospheres) to compress the gas by a corresponding fraction (e.g. ⅙) of its volume, the presence of a gas cushion is nevertheless disadvantageous because it reduces the efficiency of brake operation, as will be apparent hereinafter, and the response of the device. Thus, if it is desired to fill the housing further with the brake fluid, i.e. beyond the ⅚ possible when the charging pressure is 6 atmospheres, it is necessary to use vehicle compressors of higher efficiency and output at correspondingly increased expense, energy, cost and spatial requirements. On the other hand, failure to obtain maximum brake efficiency makes a corresponding proportion of the volume of the hydrodynamic brake useless and contributes to breakdown of the brake fluid which is admixed with the gases under pressure within the hydrodynamic brake. Moreover, the charging fluid must confront an increasingly significant gas cushion and the housing cannot be filled as rapidly as desired with as much fluid as is necessary to ensure a high response upon brake actuation. Accordingly, the presence of the gas cushion in the hydrodynamic brake housing poses a significant problem.

It is, therefore, the principal object of the present invention to provide an improved hydrodynamic brake system wherein the aforementioned disadvantages can be avoided and the efficiency of the hydrodynamic brake increased, its response quickened and its spatial requirements for a given brake effectiveness reduced.

These objects and others, which will become apparent hereinafter, are attainable, in accordance with the present invention, by the provision of a vent means, preferably a suction pump, in the brake system to evacuate the housing and, consequently, subject it to negative or subatmospheric pressure. In this manner, it is possible to facilitate the flow of brake fluid into the housing since, in addition to any pressure behind the fluid, the flow rate is increased by the suction effect ahead of it. Furthermore, the housing can be filled substantially completely and, if maintained under suction during idling of the brake system, losses arising hitherto from the pumping of gas can be eliminated.

According to a more specific feature of this invention, the suction means includes a pump which is interposed between a charging cylinder for the fluid or a reservoir and the housing of the hydrodynamic brake which, as indicated earlier, functions as a pump for the circulation of the braking fluid through a heat exchanger. The suction pump is, according to an important feature of this invention, so connected with the hydrodynamic brake that it is functionally in tandem therewith so that the pumping action of the hydraulic brake alternates with the action of the suction pump and vice versa. In addition, a gas head (e.g. atmospheric pressure) may be applied behind the reservoir to augment the dual pumping action indicated.

In one manifestation of our present invention, the pump is reversible and connected with the circulation line of the closed path via suitable check valves so that suction may be applied to the housing in one mode of operation of the pump by simply reversing its motor, while in the other mode the pump serves as the supply force of the brake fluid. A unidirectionally effective continuously operating pump can be employed together with a reversing-valve system designed to connect the housing alternately with the suction source or the reservoir. Additionally, means responsive to the pressure within the housing may be provided to cut off the pump when a predetermined subatmospheric pressure is reached and to re-energize the pump upon an increase in the pressure resulting from leakage into or within the system.

The above and other objects, features and advantages of the present invention will become more readily apparent from the following description, reference being made to the accompanying drawing in which:

FIG. 2 is a view similar to FIG. 1 of a modified brake system.

Figure 1:
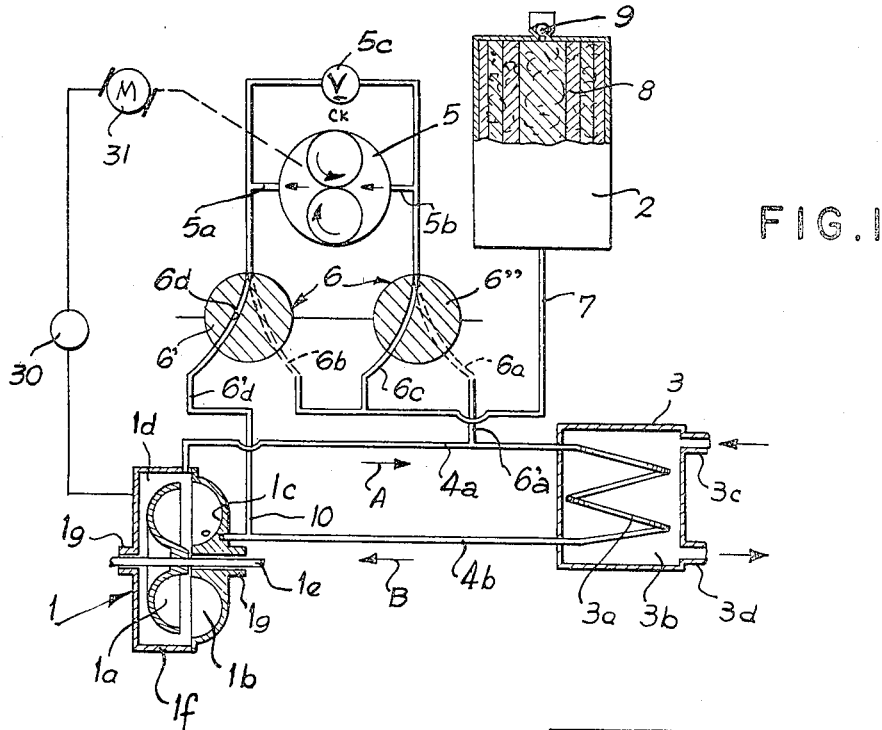
FIG. 1 is a flow diagram of a hydrodynamic brake system embodying this invention.

In FIG. 1 of the drawing, we show a hydrodynamic brake 1 whose rotor $1a$ is mounted upon a rotor shaft $1e$ represented as journaled in the housing $1f$ by bearings $1g$ illustrated in diagrammatic form. The rotor shaft may be included in a power train while the housing $1f$ and the stator $1b$ are mounted by pivot means an alignment with the universal joint of a vehicle power shaft in the manner described and illustrated in the last-mentioned copending application. The housing $1f$ forms a gas-tight chamber $1d$ in which the rotor $1a$ cooperates with the stator $1b$ to centrifugally pump the brake fluid along a closed circulating path including fluid lines $4a$ and $4b$ and an indirect, liquid/liquid heat exchanger 3. The latter has a coil $3a$ connected in series between lines $4a$ and $4d$ while the jacket $3b$ of this heat exchanger surrounds the coil $3a$ and serves for the passage of the cooling fluid via an inlet $3c$ and an outlet $3d$ into heat-transferring relationship with the coil $3a$. Chamber $3b$ may be connected in series with the cooling-water circulating system of the internal-combustion engine of the automotive vehicle as previously described. When desired, a thermostatic valve in chamber $3b$ may cut off the hydrodynamic brake 1 when the temperature in the engine-cooling system tends to exceed a predetermined maximum, thereby preventing further transfer of brake heat to the cooler.

The hydrodynamic brake installation illustrated in this figure comprises, in addition to the brake-fluid circulating system 1, $4a$, 3 and $4b$, a charging or control network including a charging cylinder 2 which is surmounted by a liquid-stripping filter 8 and a vent valve 9 open to the atmosphere. A continuously operating pump 5, which may be connected with the engine (or an electric motor 31), has its high-pressure side at outlet $5a$ and its low-pressure side at inlet $5b$ bridged by a pressure-relief valve $5c$ whose function is to shunt fluid from the inlet to the outlet side and prevent strain on the pump 5 when the fluid requirements of the hydrodynamic brake have been fulfilled and the pump is operated continuously. A pressure responsive switch 30, actuated by the pressure in housing $1f$, is connected with the motor 31 to cut off the latter when the vacuum or negative pressure in the hydrodynamic brake 1 reaches a predetermined minimum and to turn on the pump 5 when leakage causes a rise in the pressure in the brake.

Between the pump 5, the reservoir 2 and the brake 1, we provide a reversing valve 6 which is represented in diagrammatic form and has a pair of ganged valve members $6'$ and $6''$ whose passages are respectively indicated at $6b$, $6d$ and $6a$, $6c$. In one position the solid-line connections between the valve parts pertain, while in the other position of the valve the broken-line representation is effective.

As previously described, the hydrodynamic brake 1 functions as a circulating pump for the brake fluid and has a low-pressure or input side at the inner zone $1c$ of the rotor and a high-pressure or output side $1d$ along the outer zones of the rotor so that the brake-fluid flow is effectively represented by the arrows A and B of FIG. 1. The intake side $6''$ of the valve 6 is connected via a line $6a'$ with line $4a$ which communicates with the upper outer portion $1d$ of the hydrodynamic brake 1 while the discharge side $6'$ of the valve 6 communicates via a line $6d'$ with the central inner chamber $1c$ of this brake.

In the free-running or neutral condition of the brake 1, i.e. prior to the initiation of any braking operation, the valve 6 is shifted to its discharge position (broken lines in FIG. 1) in which the pump 5 draws air from the chamber 1d of the hydrodynamic brake 1 via line 4a and passage 6a of the valve 6 and thereafter discharges this fluid via the valve passage 6b and line 7 into the charging cylinder 2. The gases pass through the body of liquid in this cylinder and, after being stripped of entrained droplets of the braking liquid, pass through the vent valve 9 into the atmosphere. As a consequence, the hydrodynamic brake 1 is subjected to a subatmospheric pressure and, since the liquid has previously been removed from the housing 1f, the rotor 1a and the stator 1b produce little pumping action and energy losses previously arising from pumping action in the neutral condition of the brake are avoided. It is important to note here that there is substantially no pumping of gas or liquid.

In the other position of the valve 6, for actuation of the brake 1, the solid-line showing 6c and 6d pertains. In this position, the pump 5 draws the hydraulic brake liquid from the charging cylinder 2 via line 7, passage 6c and the suction side 5b of the pump and delivers the liquid via the pressure side 5a of the pump, passage 6d of valve 6, and line 6d' into the line 4b and the central portion (low-pressure side) 1c of the hydrodynamic brake. The hydrodynamic brake is thus charged with the liquid and pumps the same as represented by arrows A and B through the heat exchanger 3 to convert the braking action to thermal kinetic energy which is dissipated in the heat exchanger 3 in the manner described in the aforementioned patents and copending applications.

According to an important feature of this invention, the hydrodynamic brake 1 and the pump 5 are connected in series during charging and discharging, i.e. in the first instance the output side 5a of pump 5 is connected to the intake region 1c of the rotor 1a whereas in the second instance the output side 5b of the pump is connected to the discharge side 1d of the rotor, so that the hydrodynamic brake and pump can be considered as operative in the same sense. This arrangement accelerates the rate of fluid flow to the hydrodynamic brake and, therefore, the brake response upon actuation of the valve 6 is increased and ensures that the hydrodynamic brake will reach maximum braking efficiency more rapidly than has hitherto been the case. Similarly, brake operation is cut off more rapidly under control of the vehicle operator. To facilitate and accelerate the charging operation further, the vent valve 9, which partly blocks intake of air to the chamber 2, can be omitted to apply full atmospheric pressure to the liquid within the charging cylinder 2.

In the charging position of the valve 6, the atmospheric pressure acts as a gas head above the liquid level in charging cylinder 2 and in series with the intake side of pump 5b, thereby providing a supplemental driving pressure to assist the serially connected pump 5 and hydrodynamic brake 1. It should be noted too that the omission of the vent valve or the simultaneous opening thereof with switchover of the valve 6 increases the efficiency of pump 5 by eliminating any resistance at the intake side 5b thereof. Valve passages 6a and 6b are closed during this operation. When the brake operation is to be terminated, valve 6 is reversed and hydraulic fluid is withdrawn from the brake system via line 4a, passage 6a, pump 5, passage 6b and line 7 into the charging cylinder 2.

Figure 1A:
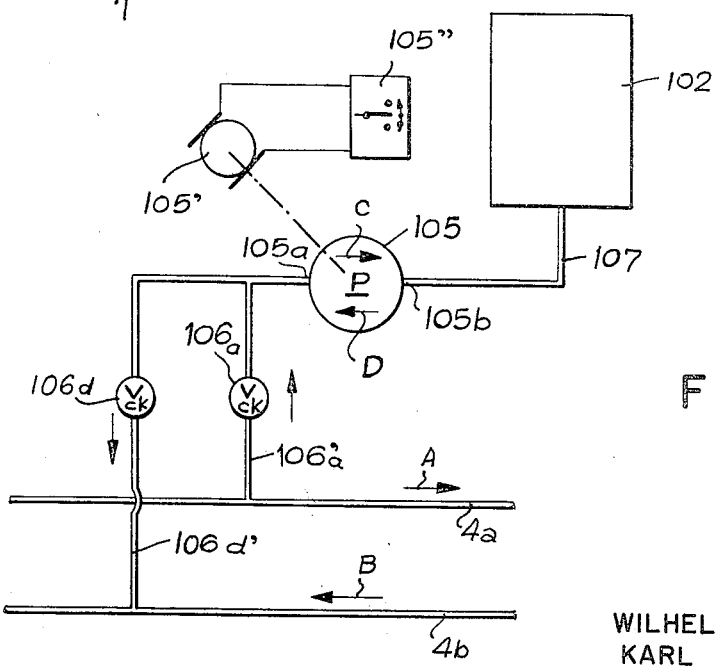
FIG. 1A is a detail view of a modification of the system of FIG. 1.

In FIG. 1A, we show a variation of FIG. 1 wherein the reversing valve 6 is omitted. In this system, a reversible suction pump 105 has one side 105b connected with the charging cylinder 102 while the other side 105a of the pump communicates via a line 106a' and a check valve 106a with the line 4a of the circulating path of the hydrodynamic brake, and via a line 106d' and a check valve 106d with the other line 4b of this circulating system. An electrically reversible motor 105' drives the pump 105 and is, in turn, controlled by a reversing circuit 105'' of conventional construction.

In operation, the system of FIG. 1A functions similarly to that of FIG. 1, except that reversal of mode is effected by reversal of the motor. Thus, in the inoperative state of the hydrodynamic brake, the pump 105 is driven in one sense (represented by arrow C) to draw air from the hydrodynamic brake via line 4a, check valve 106a and pump 105 and force it into the charging cylinder 102 which may be vented to the atmosphere via is liquid-stripping filter as previously described. A suction is thus applied to the hydrodynamic brake which is not only emptied of liquid but also maintained at a subatmospheric or negative gas pressure so that losses from the pumping of gas are also avoided. When it is desired to charge the brake, the switch of circuit 105'' is reversed to operate the motor 105' and the pump 105 in the opposite sense (arrow D). The fluid from charging cylinder 102 is drawn via line 107 through pump 105 and discharged into the hydrodynamic brake via check valve 106d and line 4b.

The embodiment of FIG. 2 provides a hydrodynamic brake 201 whose rotor 201a is mounted upon the shaft 201e which is journaled at 201g in the housing 201f. A vent conduit 212 communicates with the interior of the housing 201f close to the shaft 201c and behind the rotor; the vent conduit is connected via a check valve 213 and a liquid-removing filter 208 with the atmosphere. A spring-loaded control valve 217 is disposed between the charging cylinder 202 and the pipes 204a and 204b connecting the hydrodynamic brake 201 with the heat exchanger 203. The pump 205 is here formed by a piston 216 whose rod 216a is connected with an actuating lever 215 manually operated by the driver of the vehicle and designed to deliver fluid to the line 204b. During charging of the cylinder 202 with fluid, the valve 217 unblocks a passage 218 between the cylinder 202 and the return duct 204b from the heat exchange 203; during discharge of the cylinder 202 into the hydrodynamic brake, a passage 219, 220 is established (right-hand position of the valve 217 which is shown in its left-hand position in FIG. 2) to connect cylinder 202 with line 204a. A liquid stripper 221, a liquid-removing air-passing filter (not shown) and a liquid reservoir 222 communicate with line 204a in succession, while the vent-liquid-removing filter 208 is connected by a throttling floating-ball valve 224 with the charging cylinder 202 via line 223.

Upon a shifting of the lever 215 to the left, fluid within the charging cylinder 202 is forced against the valve 217, thereby biasing this valve against spring 217a and blocking communication between lines 219 and 220 while opening passage 218. The fluid is thus forced via line 204b into the hydrodynamic brake to charge the latter, and the air within the brake is forced via the vent line 212 to the atmosphere past the check valve 213 and the liquid remover 208. To empty the brake, the lever 215 and piston 216 are drawn into their extreme right-hand position to shift the valve body 217b to the right under the joint action of reduced fluid pressure and the spring 217a, thereby blocking passage 218 and interconnecting lines 219 and 220. The liquid-stripping blades 221 trap the centrifugally displaced liquid from rotor 201a and collect it in reservoir 222. This state is promoted by the reduced pressure applied at lines 219 and 220 via plunger 216. With increasing discharge of fluid, the chamber 201f of the hydrodynamic brake is subjected to increasing suction. To increase the response, of course, lever 215 and/or the piston 216 may be operated by a double-acting hydraulic servocylinder H and via a ratchet lever or a proportioning valve facilitating the displacement of piston 216.

In the operative state of the hydrodynamic brake in which piston 216 is in its right-hand position, fluid leakage bypasses the floating check member of the valve 224 and its throttle to reverse the circulation system 204a–204b. As illustrated, the fluid drawn into the system can enter ahead of the piston 216 or between the main bearings 201g and their seals 201h as represented by the dot-dash line 224a. In the latter case, the bearings and seals are additionally lubricated and cooled.

We claim:

1. In an automotive vehicle in combination with a vehicle-driving power train, a hydrodynamic brake comprising a housing provided with a stator and a rotor confronting said stator connected with said power train for braking the latter by transforming braking energy into heat of a hydraulic braking fluid, said housing having a hydraulic-fluid inlet and a hydraulic-fluid outlet; a heat exchanger having an inlet and an outlet for dissipating heat into the atmosphere; means including a first conduit permanently connecting said inlet of said housing with said outlet of said heat exchanger, and a second conduit permanently connecting said outlet of said housing with said inlet of said heat exchanger, thereby forming a closed fluid-circulating path for dissipating in said heat exchanger the heat generated in said hydraulic fluid by said hydrodynamic brake and coupled with said brake for circulation of said hydraulic fluid around said path by said rotor; means including a hydraulic pump having a suction side at subatmospheric pressure connectable with one of said conduits for abstracting gas from said housing prior to charging of said housing with said hydraulic fluid, thereby increasing the rate at which fluid enters said housing and the extent to which said hydraulic fluid can enter said housing, and a pressure side connectable with the other conduit for forcing said hydraulic fluid into said housing, said path bypassing said pump; and control means for alternately connecting said suction side and said pressure side to said housing through the respective conduits.

2. The combination defined in claim 1, further comprising a reservoir for said brake fluid, said pump being reversible and connected between said reservoir and said housing, said control means including means for driving said pump in one sense to force fluid from said reservoir into said housing and for driving said pump in an opposite sense to drain fluid from said housing into said reservoir while subjecting said housing to subatmospheric pressure.

3. The combination defined in claim 1, further comprising means responsive to the pressure in said housing for disconnecting said source therefrom.

4. The combination defined in claim 1, further comprising a reservoir for said fluid, said pump being unidirectionally effective, said control means including reversing-valve means inserted between said reservoir, said pump and said housing and operable in a first mode to connect the discharge side of said pump with said housing and the intake side of said pump with said reservoir, and in a second mode to connect said discharge side of said pump with said reservoir and said intake side of said pump with said housing to evacuate said fluid and gas from said housing and apply subatmospheric pressure thereto.

5. The combination defined in claim 4 wherein said valve means is so constructed and arranged as to connect the intake side of said pump with the housing at the outer periphery of said rotor in said second mode and to connect the discharge side of said pump with a central region of said housing in said first mode.

6. The combination defined in claim 1 wherein said vent means includes a vent line communicating with said housing in the region of the rotor shaft and at the side of said rotor opposite said stator, said line including a check valve unidirectionally passing gas from said housing and means for separating said brake fluid from the gas passed from said housing.

7. The combination defined in claim 6, further comprising means for connecting said means for separating the liquid with said housing for lubricating said rotor.

8. The combination defined in claim 6, further comprising a reservoir for said brake fluid, said pump being piston operated and connected between said reservoir and said housing, said control means including valve means in said pump effective upon pressurization therefrom to connect the pressure side of said pump with said housing and effective upon depressurization of said reservoir to pass fluid from said brake to said reservoir.

9. The combination defined in claim 8, further comprising means connecting said vent line with said reservoir.

10. The combination defined in claim 8, further comprising fluid-stripper means along said housing for trapping liquid centrifugally displaced by said rotor, and liquid-collecting means between said stripper means and said valve means.

References Cited

UNITED STATES PATENTS

| | | |
|---|---|---|
| 1,758,207 | 5/1930 | Walker. |
| 2,116,992 | 5/1938 | Weaver. |
| 2,287,130 | 6/1942 | Ramey. |
| 2,748,899 | 6/1956 | Booth et al. |
| 3,297,114 | 1/1967 | Erdman et al. |
| 3,311,200 | 3/1967 | Hayward. |
| 3,373,847 | 3/1968 | Rohacs _____ 188—90 |

GEORGE E. A. HALVOSA, Primary Examiner

U.S. Cl. X.R.

188—264